(12) United States Patent
Liu et al.

(10) Patent No.: US 12,395,812 B2
(45) Date of Patent: Aug. 19, 2025

(54) METHOD AND SYSTEM FOR PROXIMITY-BASED EVENT CLUSTERING IN A NETWORK

(71) Applicant: Arista Networks, Inc., Santa Clara, CA (US)

(72) Inventors: Albert Yat Chor Liu, Richmond (CA); Brendan Murray, Maynooth (IE); Guy Sirton, Delta (CA)

(73) Assignee: Arista Networks, Inc., Santa Clara, CA (US)

( * ) Notice: Subject to any disclaimer, the term of this patent is extended or adjusted under 35 U.S.C. 154(b) by 670 days.

(21) Appl. No.: 17/690,503

(22) Filed: Mar. 9, 2022

(65) Prior Publication Data

US 2023/0292081 A1 Sep. 14, 2023

(51) Int. Cl.
*H04W 4/021* (2018.01)
*H04W 4/02* (2018.01)

(52) U.S. Cl.
CPC ........... *H04W 4/021* (2013.01); *H04W 4/023* (2013.01)

(58) Field of Classification Search
None
See application file for complete search history.

(56) References Cited

U.S. PATENT DOCUMENTS

| | | | |
|---|---|---|---|
| 7,010,593 B2* | 3/2006 | Raymond | H04L 41/18 709/224 |
| 7,408,440 B2* | 8/2008 | Korzeniowski | H04L 67/535 370/242 |
| 8,448,221 B2* | 5/2013 | Pearcy | H04L 43/045 726/1 |
| 8,588,078 B1* | 11/2013 | Fugate | H04L 41/5074 370/241 |
| 9,529,890 B2* | 12/2016 | Tee | H04L 41/0893 |
| 9,621,661 B2* | 4/2017 | Diem | H04M 1/72457 |
| 9,924,029 B2* | 3/2018 | Shaw | H04M 3/42153 |
| 10,319,210 B2* | 6/2019 | Kurniawan | G08B 21/18 |
| 10,375,513 B2* | 8/2019 | Gillespie | H04L 51/222 |
| 10,614,143 B2* | 4/2020 | Jiang | G06F 16/9535 |
| 10,721,254 B2* | 7/2020 | Kotinas | G06V 10/764 |
| 10,785,090 B2* | 9/2020 | Vasseur | G06N 3/045 |
| 11,277,420 B2* | 3/2022 | Côté | G06F 18/2413 |
| 11,294,748 B2* | 4/2022 | Settle | G06F 11/3055 |
| 11,368,548 B2* | 6/2022 | Lipstone | H04L 65/80 |
| 11,373,272 B2* | 6/2022 | Kolb, V | G06T 5/73 |
| 11,501,042 B2* | 11/2022 | Steingrimsson | G06Q 30/0202 |
| 11,514,084 B2* | 11/2022 | Savalle | G06F 16/906 |

(Continued)

FOREIGN PATENT DOCUMENTS

| | | | | |
|---|---|---|---|---|
| EP | 1065894 A1 * | 1/2001 | | H04Q 3/0075 |
| GB | 2459332 A * | 10/2009 | | H04L 12/5885 |

*Primary Examiner* — Melvin H Pollack
(74) *Attorney, Agent, or Firm* — Sprinkle IP Law Group

(57) ABSTRACT

Methods and devices for grouping events in a network are disclosed. The method includes receiving notification of a first event that includes attributes of the first event; determining a score between the first event and a second event; and grouping the first event and the second event into a first group based on the score. The method includes determining a first distance in a first dimension between the first event and the second event and calculating the score based on the first distance. The method further includes displaying the first group on a user interface (UI).

20 Claims, 5 Drawing Sheets

(56) References Cited

U.S. PATENT DOCUMENTS

| | | | |
|---|---|---|---|
| 11,544,550 B2* | 1/2023 | Graham | G06F 16/90335 |
| 11,620,528 B2* | 4/2023 | Ryan | G06N 3/045 |
| | | | 709/224 |
| 11,636,161 B1* | 4/2023 | Chang | G06F 16/906 |
| | | | 707/737 |
| 11,675,816 B1* | 6/2023 | Chandrasekharan | |
| | | | G06F 11/3082 |
| | | | 707/737 |
| 11,755,559 B1* | 9/2023 | Tankersley | G06F 16/2358 |
| | | | 707/694 |
| 12,001,515 B2* | 6/2024 | Khanna | G06F 18/2431 |
| 2009/0222309 A1* | 9/2009 | Velazquez | G06Q 10/1093 |
| | | | 705/7.18 |
| 2011/0047174 A1* | 2/2011 | Reimer | G06F 16/4387 |
| | | | 707/769 |
| 2011/0099500 A1* | 4/2011 | Smith | H04L 41/22 |
| | | | 715/771 |
| 2012/0265805 A1* | 10/2012 | Samdadiya | G06F 11/3466 |
| | | | 709/203 |
| 2015/0148068 A1* | 5/2015 | Urruela Planas | H04W 4/029 |
| | | | 455/456.1 |
| 2020/0021482 A1* | 1/2020 | Lo | H04L 41/0631 |
| 2024/0386054 A1* | 11/2024 | Wouhaybi | G06F 16/901 |

* cited by examiner

METHOD AND SYSTEM FOR PROXIMITY-BASED EVENT CLUSTERING IN A NETWORK

BACKGROUND

Information technology (IT) networks may include numerous interconnected computing devices, routers, switches and/or other network elements. Network maintenance and monitoring includes the collection and analysis of event log data and other system parameters.

BRIEF DESCRIPTION OF DRAWINGS

Certain embodiments of the disclosure will be described with reference to the accompanying drawings. However, the accompanying drawings illustrate only certain aspects or implementations of the disclosure by way of example and are not meant to limit the scope of the claims.

DETAILED DESCRIPTION

Figure 1:
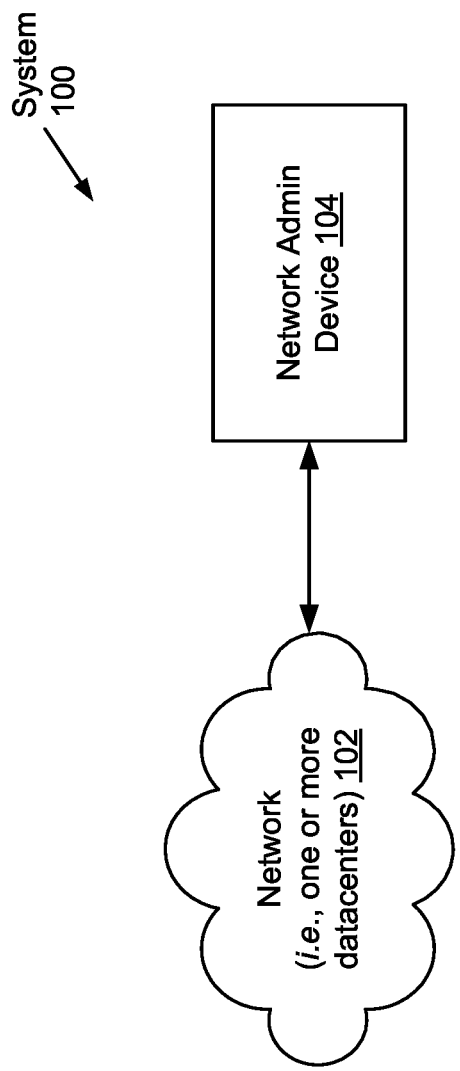
FIG. 1 shows a system in accordance with one or more embodiments disclosed herein.

As the number of interconnected devices in a network becomes greater, the number of events logged in IT networks may become overwhelming for network administrators. Further, a large number of events may obfuscate an issue in the network that requires the administrator's attention. For example, multiple logged events may be caused by a single underlying issue, and often no single event may identify the primary issue directly. Additional insights derived from related events may be necessary to identify issues or problems in the network operation. Currently, events may be reported based on a network component associated with the event and presented in chronological order. However, such reporting ignores higher abstractions, such as specific technology domains or a proximity to other reported events.

In general, embodiments disclosed herein provide techniques for automatically grouping logged events in a network. By grouping events in accordance with embodiments disclosed herein, the system may display network conditions in higher abstractions, allowing network operators to focus on events of interest in a more efficient manner Embodiments disclosed herein provide network operators an efficient, powerful tool for managing networks that groups events and displays the resultant group on a display or a User Interface (UI). The user also has the option to select the group and expand the display to include the individual events of the group. Such expansion allows the user to view details of individual events. The UI allows the user to examine and acknowledge the presented events and event groups, as well as add notes.

In embodiments disclosed herein, the events may be grouped based on a determined proximity to one or more different events or groups. The proximity may be determined based on relative distances between the events and groups in various dimensions. In this context, a dimension refers to any measurable or configurable variable that may be relevant to the grouping of the events. Thus, embodiments provide configurable group perimeters in an N-dimensional space to provide the grouping and organization of the events.

In embodiments disclosed herein, dimensions may include, but are not limited to, time, physical space, virtual space, type, and communication protocol. For example, in a time dimension, the distance may be determined based on the relative time between the two events. As another example, in a physical space dimension, a relative distance may be determined based on whether the events are from the same device, same interface, same device but different interfaces, interfaces that are separated by one hop, or interfaces that are separated by two hops. As another example, in a type dimension, a relative distance between two events may be determined based on whether the events are the same type, related types, or unrelated types. The distance encapsulates how far apart two events are in one dimension in accordance with embodiments disclosed herein. As a further example, communication protocols may include, but are not limited to, system information associated with an Internet Protocol Security (IPSec) protocol, a Virtual Extensible Local Area Network (VXLAN) protocol, a Border Gateway Protocol (BGP), a Link Layer Discovery Protocol (LLDP). In one or more embodiments, the virtual space corresponds to a logical relationship between physical components. For example, a port channel interface defines a virtual interface to multiple physical interfaces in a device. A port channel may correspond to one or more (ethernet) connections. Virtual space dimensions may correspond to a relative distance between the different port channels and ethernet connections. In another example of virtual space, consider a scenario in which there are three network devices ND1, ND2, and ND3 that are connected in the following physical topology ND1←→ND2←→ND3. Further, assume that ND1 and ND3 are configured as neighbors in an overlay network. In this scenario, the physical space represents the physical connectivity between the network devices, while the virtual space represents the logical connectivity provided by the overlay network. Thus, ND1 and ND3 are not directly connected in physical space but are directly connected in virtual space. None of the aforementioned examples is intended to limit the scope of the disclosure.

In one or more embodiments, the distance may be expressed as a weighted value in the range from 0 to 1. In such embodiments, the smaller the distance in the dimension, the closer the weighted value is to 1. For example, in a type dimension, events of the same type may have a weighted value of 1, while events of unrelated types may have a weighted value of 0. Events of related types may have a weighted value between 0 and 1, for example, 0.6. As another example, in a physical space dimension, the weighted value representing the distance between events of the same device and same interface may be 1. The weighted values may decrease for events of the same device but different interfaces, interfaces that are separated by one hop, and interfaces that are separated by two hops in accordance with embodiments disclosed herein.

The determined distances in the N dimensions result in a vector of N weights that determines an N-dimensional coordinate, relative to the two events in accordance with embodiments disclosed herein. From the vector of weights, a score value (magnitude) is calculated. The events and groups may be clustered into existing or new groups if the computed score exceeds a threshold value (which may be statically or dynamically defined).

In embodiments disclosed herein, a group of events may be compared to an event or another group of events based on the dimensions of one or more of the events present in the group. In methods disclosed below, the term event may refer to a single event or a group of events, where an event corresponds to any notification issued by any hardware and/or software component on a network device. Non-limiting examples of events include error notifications (which may specify a hardware fault and/or software error), warning notifications (which specifies a warning related to a software or hardware component), notifications related to a hardware state of a hardware component (e.g., a temperature notification), etc. In one embodiment, a single notification may correspond to a single event; alternatively, a single notification may correspond to a group of events. As such, events may be grouped into multiple layers of groupings. That is, events may be grouped and displayed in a manner such that a group may be expanded to show individual members, and then one or more of the individual members (i.e., groups) may be further expanded. In some embodiments, the dimensions considered in determining the distance when comparing to a group may be dimensions that are common (equal) among all the events in the group.

Various embodiments discussed above are now described in more detail below.

FIG. 1 shows a system in accordance with one or more embodiments disclosed herein. The system (100) includes a network (102) and a network administrator device (104). These components are subsequently described. The network (102) may be any type of network that establishes connectivity between computing devices. The connectivity may be established by a combination of interconnected network elements such as routers and switches that form a network fabric. In embodiments disclosed herein, the network (102) may represent the global information technology (IT) infrastructure belonging to or associated with a given organization. Deployment of the aforementioned infrastructure may entail a single- or multi-datacenter solution. A datacenter (not shown), in turn, may encompass a collection of interconnected network devices (not shown), which may be co-located at a given geographical site. Intra-communications amongst network devices of a given datacenter (in a single-datacenter solution), or inter-communications amongst network devices between datacenters (in a multi-datacenter solution), may be enabled through wired and/or wireless connections that may employ any existing wired and/or wireless communication protocol(s). By way of examples, when deployed as a single-datacenter solution, the network (102) may represent a local area network (LAN), whereas when deployed as a multi-datacenter solution, the network (102) may represent a wide area network (WAN), which may interconnect multiple LANs.

The network administrator device (104) is a network device that includes software for monitoring and managing the network (102) in accordance with one or more embodiments disclosed herein. Elements of the network administrator device (104) are further described below, with reference to FIGS. 2 and 5.

Figure 2:
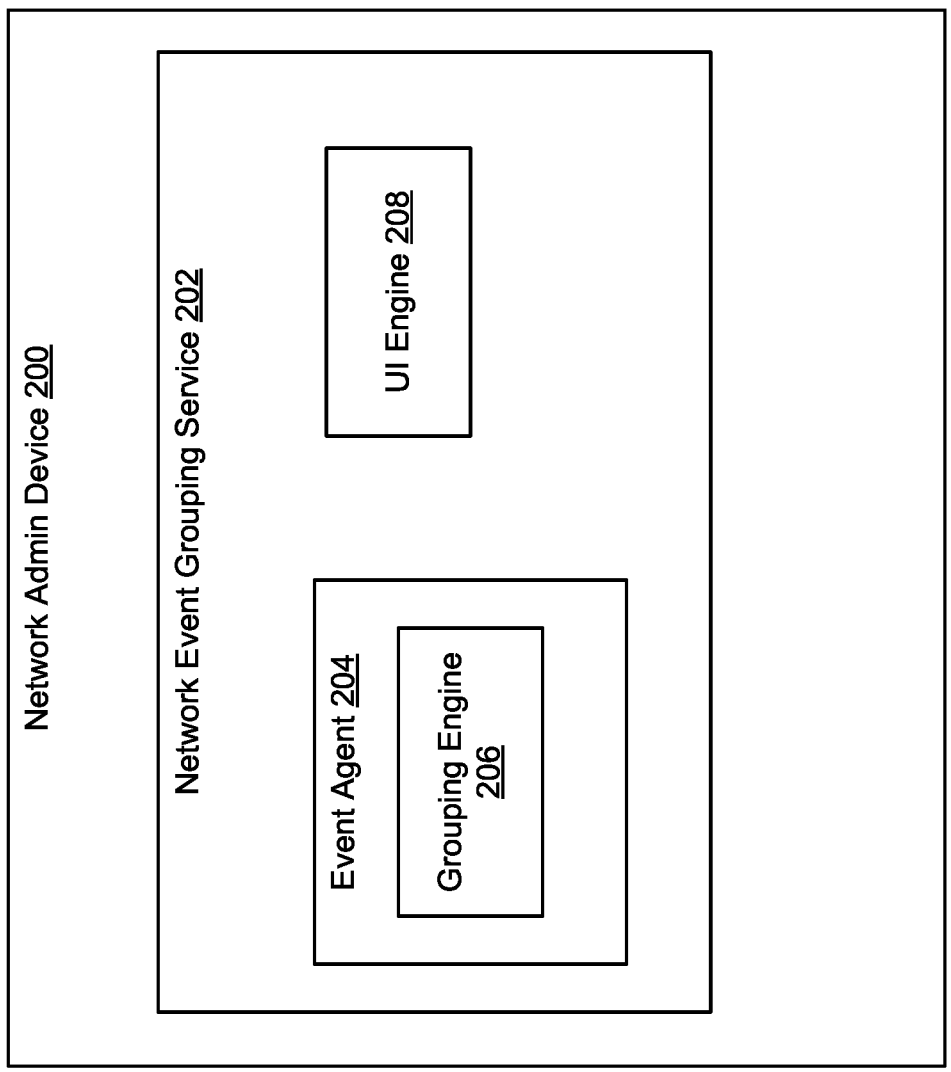
FIG. 2 shows a network administrator device in accordance with one or more embodiments disclosed herein.

FIG. 2 demonstrates a network admin device in accordance with one or more embodiments disclosed herein. The network admin device (200) includes a network event grouping service (202). The network device grouping service (202) includes an event agent (204) that includes a grouping engine (206). The grouping engine (206) is responsible for determining the distances in the N dimensions between two events in accordance with embodiments disclosed herein. The grouping engine may also be responsible for determining the weight of the N dimensional vectors. The network event grouping service (202) may also include a UI engine (208) for generating the UI for presentation on a display (not shown). In one or more embodiments, the resulting grouping of events generated by the network event grouping service (202) may be provided to another entity (e.g., a management service, support service, etc.) via a push and/or pull/subscription mechanism. In another embodiment, the aforementioned results may also be stored in a manner that maintains the groupings identified by the network event group service. This stored information may then be queried by, e.g., technical support and/or administrative user to troubleshoot the network device and/or the network.

Figure 3:
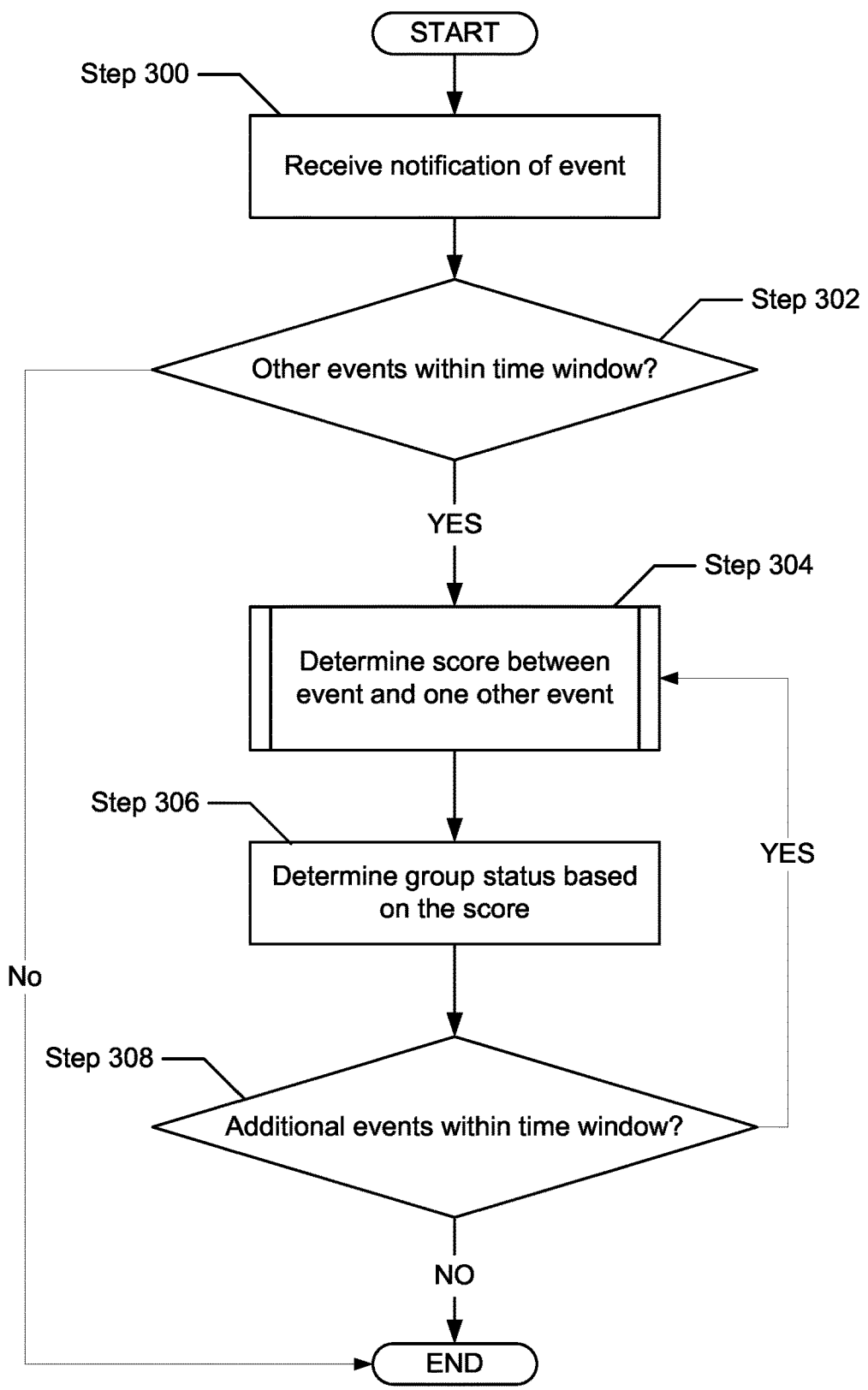
FIG. 3 shows a flow chart of grouping events in accordance with one or more embodiments disclosed herein.

FIG. 3 shows a flow chart of grouping events in accordance with one or more embodiments disclosed herein. Embodiments of FIG. 3 may be performed by the network event grouping service (202). In some embodiments the grouping engine (206) of the network event grouping service (202) may perform one or more steps of the embodiments of FIG. 3. In Step 300, notification of an event may be received. The notification of an event may be generated by a software component on a network admin device (see e.g., FIG. 2, 104) and provided (via a push or pull mechanism) to the network event group service. The notification of an event may originate from other sources within the network without departing from the disclosure. The notification may include attributes of the first event. The attributes include the necessary information of the dimensions to determine the weighted distance described below.

In the embodiments of FIG. 3, in Step 302, it is determined if the event occurs within a time window (which may be statically or dynamically defined) with respect to another event or group. In these embodiments, the time window is established to provide an initial boundary for calculating a score between the recently occurred event and other events or groups that have previously occurred. The time window (which may be statically or dynamically defined) may be set to a value such that a score is calculated between the event and other events that may be related to the event, while avoiding calculating scores between the event and (likely) unrelated events. In one non-limiting example, the time window may be 30 seconds. The duration of the time window may be larger or smaller depending on the implementation of one or more embodiments of the disclosure.

If there are no other events that have occurred in the time window (No in Step 302), the grouping process ends.

If it is determined that another event has occurred in the time window (YES in Step 302), a score is calculated between the event and the other event in Step 304. Calculating the score is described further below with reference to FIG. 4. As described, the score is a numerical representation of a relationship between two recorded events or groups.

In Step 306, a group status is determined based on the score. In one or more embodiments disclosed herein, the group status may be established by comparing the score to a threshold (which may be dynamically or statically defined). For example, if the resultant score is above the threshold, the event may be grouped with the other event and, if the resultant score is below the threshold, the event may not be grouped with the other event.

The grouping of the two events may indicate that the examined event belongs in a pre-existing group in accordance with embodiments disclosed herein. For example, if an examined event is determined to be grouped with another event that has already been grouped with one or more events.

In Step 308, it is determined if there are any additional events that have occurred in the time window. If there are additional events that have occurred in the time window, the process returns to Step 304, and a score is determined between the event and the additional events. The process repeats Steps 304-308 until a score is determined between the event and all the events that have occurred within the time window.

Embodiments disclosed herein are not limited to using the predetermined time window as described above. As noted above, the time window is established to avoid calculating scores between likely unrelated events. For example, upon notification of an event, a score may be calculated between the event and a set number of previously recorded events. The score between the event and the set number of previously recorded events may be determined in reverse chronological order, starting with the most recent previous event.

Figure 4:
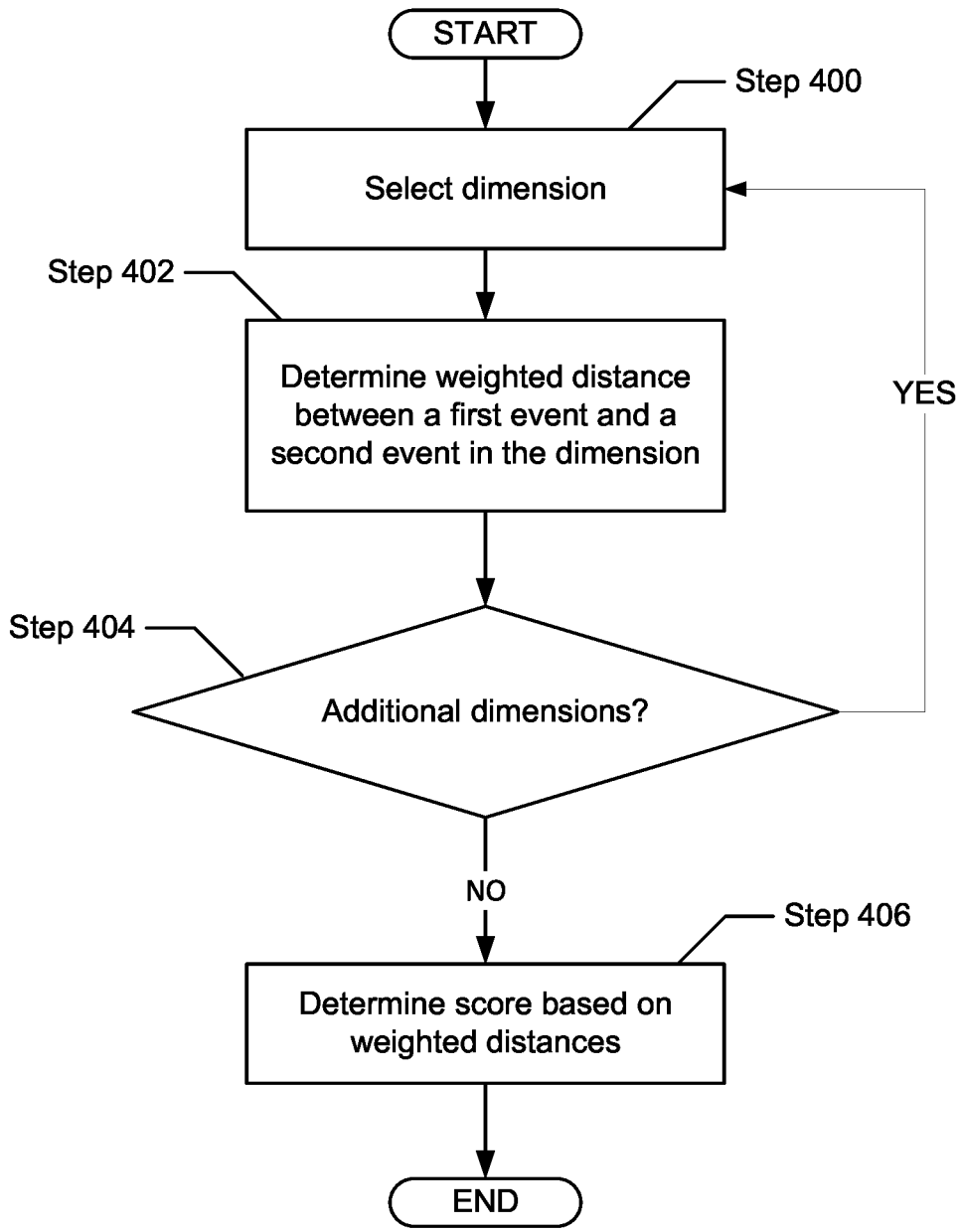
FIG. 4 shows a flow chart calculating a score in accordance with one or more embodiments disclosed herein.

FIG. 4 shows a flow chart calculating a score for N dimensions in accordance with one or more embodiments disclosed herein. Embodiments of FIG. 4 may be performed by the network event grouping service (202). In some embodiments the grouping engine (206) of the network event grouping service (202) may perform one or more steps of the embodiments of FIG. 4. In Step 400, one of the N dimensions is selected for consideration. The number of dimensions may be selected by a user, based on a heuristic(s), based on a default set of dimensions to be considered, or any combination thereof. As previously noted, a dimension refers to any measurable or configurable variable that may be relevant to the grouping of the events. For example, dimensions may include, but are not limited to, time, physical space, virtual space, type, and communication protocol.

In Step 402, a weighted distance between a first event and a second event is determined in the selected dimension. For example, in a time dimension, the weighted distance may be based on the relative time between the two events. The weighted distance establishes how far apart the two events are in the selected dimension in accordance with embodiments disclosed herein. In one or more embodiments, the distance may be expressed as a weighted value in the range from 0 to 1. For example, the smaller the distance in the dimension, the closer the weighted value is to 1. As a more specific example, in a physical space dimension, the weighted value representing the distance between events of the same device and same interface may be 1, and the weighted values may decrease for events of the same device but different interfaces, interfaces that are separated by one hop, and interfaces that are separated by two hops in accordance with embodiments disclosed herein.

In Step 404, it is determined if there are additional dimensions to be considered. The determination of whether there are additional dimensions to consider may be performed by a user (e.g., the user specifies multiple dimensions to consider). In another embodiment, the group engine may have a default set of dimensions to consider. In this scenario, the determination step 404 corresponds to determining whether all of the set of dimensions have been considered. If there is an additional dimension to consider, the process returns to Step 400. If there are no additional dimensions to consider, the process proceeds to Step 406. In embodiments disclosed herein, there is no limit on the number of dimensions considered. In Step 406, a score is determined between the first and second events based on the weighted distances. For example, if there is only one dimension considered then step 406 determines a score by applying a function to the weighted distance to generate the score. If there are multiple dimensions considered, then step 406 determines the score by applying a function to the set of weighted distances. In accordance with other embodiments disclosed herein, the determined weighted distances in the N dimensions result in a vector of N weights that determines an N-dimensional vector, relative to the first and second events. In one or more embodiments, the score is based on an operation on the vector of weighted distances, e.g., a magnitude of the vector or a product of the weights.

EXAMPLE

The following is one example of the embodiments disclosed herein. In this example, three dimensions are considered: time, physical space, and type. In the example, notifications are received for Event A and Event B. The notification for Event A specifies that Event A occurred at 12:32:05 PM in device EXMPL and is associated with a hardware fault in the device. The notification for Event B specifies that Event B also occurred at 12:32:05 PM in device EXMPL and is associated with a temperature sensor in the device.

The score between Event A and Event B is evaluated to determine if Event B should join a group of Event A. To determine the score, a vector of weights, where each component of the vector represents a weighted distance in each dimension, is determined. Each weighted distance is a value within [0,1] range, with 1 considered the closest and 0 being most distant. Continuing the example, in the time dimension, the time indicated in Event A is the same time indicated in Event B. Therefore, the weighted vector component in the time dimension is 1. In the physical space dimension, it is determined that Event A and Event B occurred at the same device (EXMPL). Therefore, the weighted vector component in the space dimension is 1. In the type dimension, it is determined that the type is related. For this example, when the type is considered the same, the weighted value is 1; when the type is related, the weighted value is 0.5; and when the type is unrelated, the weighted value is 0. Therefore, the weighted vector component in the type dimension is 0.5.

The score is then computed by multiplying the weighted vector components. In this example, the three-dimensional score=1 (time)×1 (space)×0.5 (type)=0.5. The score is compared to a value (threshold) of, say, 0.4. Because the score exceeds the threshold, Event B is deemed to be close enough to Event A to be grouped together. Because Event A does not belong to any other groups, a new group is created containing Event A and Event B.

End of Example

Figure 5:
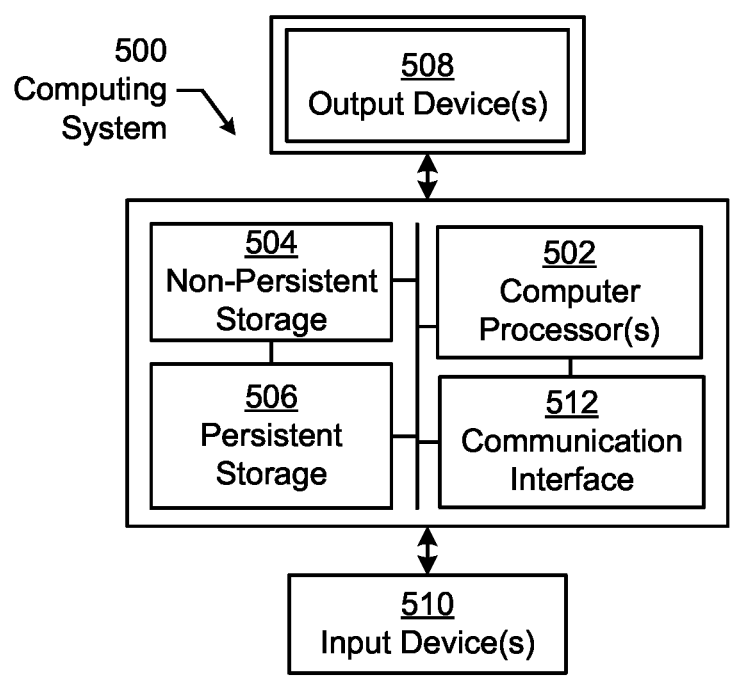
FIG. 5 shows a computing device in accordance with one or more embodiments disclosed herein.

FIG. 5 shows a computing device in accordance with one or more embodiments disclosed herein. As previously mentioned, embodiments of the disclosure may be implemented using computing devices. The computing device may function as a network admin device as demonstrated in FIG. 1. Embodiments may also be implemented on a computing device dedicated to grouping events, or interacting with the UI.

The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of the components illustrated in FIG. 5 is described below.

In one embodiment of the disclosure, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the disclosure, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The output devices may be used to display results or the UI in accordance with one or more embodiments disclosed herein. The input and output device(s) may be locally or remotely connected to the computer processor(s) (502), non-persistent storage (504), and persistent storage (506). Many different types of computing devices exist, and the aforementioned input and output device(s) may take other forms.

Embodiments disclosed herein may provide insights to identify issues or problems in the network operation. By grouping events in accordance with embodiments disclosed herein, the system may display network conditions in higher abstractions, allowing network operators to focus on events of interest in a more efficient manner Embodiments disclosed herein may provide network operators an efficient, powerful tool for managing networks that groups events and displays the resultant group. A UI advantageously allows a user to examine the event groups, as well as individual events, to diagnose and address problems in network operation.

The advantages discussed above throughout the detailed description should be understood as being examples associated with one or more problems being solved by embodiments of the disclosure.

In the above description, numerous details are set forth as examples of embodiments described herein. It will be understood by those skilled in the art, that have the benefit of this Detailed Description, that one or more embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components.

Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method of grouping events in a network, the method comprising:
    receiving notification of a first event that includes attributes of the first event;
    determining a score between the first event and a second event based on a vector of distances determined between the attributes of the first event and the attributes of the second event, wherein the second event occurs within a amount of time from the first event;
    grouping the first event and the second event into a first group based on the score determined based on the vector of distances; and
    displaying the first group on a display.

2. The method of claim 1, wherein determining the score between the first event and the second event comprises:
    determining a first distance in a first dimension between the first event and the second event;
    calculating the score based on the first distance.

3. The method of claim 1, wherein determining the score between the first event and the second event comprises:
    determining a first distance in a first dimension between the first event and the second event;
    determining a second distance in a second dimension between the first event and the second event; and
    calculating the score based on the first distance and second distance.

4. The method of claim 3, wherein calculating the score comprises multiplying the first distance with the second distance.

5. The method of claim 1, wherein the first dimension is based on the attributes, and wherein the attributes include one or more of the following: event type, interface associated with the event, device associated with the event, and a time of the event.

6. The method of claim 2, wherein the first dimension is based on system information and wherein the system information includes information associated with one or more of the following: an Internet Protocol Security (IPSec) protocol, a Virtual Extensible Local Area Network (VXLAN) protocol, a Border Gateway Protocol (BGP), a Link Layer Discovery Protocol (LLDP).

7. The method of claim 2, wherein the first dimension is one selected from the following: time, physical space, virtual space, type, and communication protocol.

8. The method of claim 1, wherein the score is based on at least a proximity of the first event and the second event in N-dimensional space, wherein N>1.

9. The method of claim 1, wherein grouping the first event and the second event into the first group based on the score comprises comparing the score to a threshold.

10. The method of claim 2, wherein the first distance is expressed as a weighted value between zero and one.

11. The method of claim 1, wherein the display is a user interface (UI), and wherein the first group on the UI may be expanded to display the first and second events.

12. A method of grouping events in a network, the method comprising:
    determining a distance between a first event and a second event, wherein determining the distance comprises comparing a set of coordinates in one or more dimensions for the first event and the second event, wherein the set of coordinates used to determine the distance is based on a vector determined based on attributes of the first event and of the second event;
    determining a score based on the set of compared coordinates based on the vector;
    grouping the first event and the second event into a first group based on the score; and
    displaying the first group on a user interface (UI).

13. The method of claim 12, wherein the one or more dimensions are selected from the following: time, physical space, virtual space, type, and communication protocol.

14. The method of claim 12, wherein the score is based on at least a proximity of the first event and the second event in N-dimensional space, wherein N>1.

15. The method of claim 12, wherein the first group comprises one or more events prior to grouping the first event and the second event.

16. The method of claim 12, wherein the second event is a group of events.

17. The method of claim 12, further comprising:
    determining a second distance between a third event and a fourth event, wherein determining the second distance comprises comparing a second set of coordinates in one or more dimensions for the first event and the second event;
    determining a second score based on the second set of compared coordinates; and
    grouping, based on the second score, the third event into a second group and the fourth event in a third group.

18. A network administrator device comprising:
    a processor comprising circuitry;
    a network event grouping service executing on the processor, and configured to:
        receive notification of a first event that includes attributes of the first event;
        determine a score between the first event and a second event based on a vector of distances determined between attributes of the first event and attributes of the second event, wherein the second event occurs within an amount of time from the first event;
        group the first event and the second event into a first group based on the score determined based on the vector; and
        display the first group on a display.

19. The device of claim 18, wherein determining the score between the first event and the second event comprises:
    determining a first distance in a first dimension between the first event and the second event;
    determining a second distance in a second dimension between the first event and the second event; and
    calculating the score based on the first distance and second distance, wherein calculating the score comprises multiplying the first distance with the second distance.

20. The device of claim 18, wherein the first dimension in one selected from the following: time, physical space, virtual space, type, and communication protocol.

* * * * *